US011926033B2

(12) United States Patent
Omry et al.

(10) Patent No.: US 11,926,033 B2
(45) Date of Patent: Mar. 12, 2024

(54) SAWHORSE

(71) Applicant: The Stanley Works Israel Ltd., Rosh Ha'ayin (IL)

(72) Inventors: Adar Omry, Hertzeliya (IL); Ohad Waissengreen, Emek Sorek (IL); Amit Ran, Mazkeret Batya (IL); Nir Yona, Rehovot (IL)

(73) Assignee: The Stanley Works Israel Ltd., Rosh Ha'ayin (IL)

( * ) Notice: Subject to any disclaimer, the term of this patent is extended or adjusted under 35 U.S.C. 154(b) by 0 days.

(21) Appl. No.: 17/965,227

(22) Filed: Oct. 13, 2022

(65) Prior Publication Data

US 2023/0034315 A1 Feb. 2, 2023

Related U.S. Application Data

(63) Continuation of application No. 17/394,936, filed on Aug. 5, 2021, now Pat. No. 11,491,635.

(30) Foreign Application Priority Data

Aug. 19, 2020 (EP) .................................... 20191713

(51) Int. Cl.
*B25H 1/06* (2006.01)
*B27B 17/00* (2006.01)

(52) U.S. Cl.
CPC .......... *B25H 1/06* (2013.01); *B27B 17/0041* (2013.01)

(58) Field of Classification Search
CPC ... B25H 1/06; B25H 1/16; B25H 1/04; B25H 1/08; B25H 1/10; B25H 1/18; B25H 3/00; B25H 3/04; B25H 3/06; B23Q 9/0042; B23Q 9/0014; A47B 2200/0016
USPC .............. 269/16, 134–136, 289 R, 290, 309
See application file for complete search history.

(56) References Cited

U.S. PATENT DOCUMENTS

| | | | | |
|---|---|---|---|---|
| 7,185,738 | B1 * | 3/2007 | Clepper | B25H 1/06 182/155 |
| 9,920,558 | B1 * | 3/2018 | Chou | E05D 11/1007 |
| 10,675,749 | B2 * | 6/2020 | Reinhart | B25H 1/14 |
| 2018/0099403 | A1 * | 4/2018 | Reinhart | B25H 1/005 |

* cited by examiner

*Primary Examiner* — Lee D Wilson
*Assistant Examiner* — Robert F Neibaur
(74) *Attorney, Agent, or Firm* — Bruce S. Shapiro

(57) ABSTRACT

A sawhorse includes a modular work surface supported by a frame. The modular work surface includes a first side portion, a second side portion and a central portion. The modular work surface is configured to move between a compact configuration and an expanded configuration. In the compact configuration the first side portion and the second side portion are adjacent to one another to provide a compact worktop and the central portion is positioned beneath the compact worktop. In the expanded configuration, the first side portion and the second side portion are distal to one another and the central portion is positioned therebetween to create an expanded worktop.

14 Claims, 8 Drawing Sheets

SAWHORSE

CROSS-REFERENCE TO RELATED APPLICATION

This application is a continuation of U.S. patent application Ser. No. 17/394,936 filed Aug. 5, 2021, which claims priority and benefit to EP Patent Application No. 20191713 filed Aug. 20, 2020, under 35 U.S.C. § 119.

FIELD OF THE INVENTION

The present invention relates to a sawhorse. More particularly, to an expandable sawhorse having a modular work surface that can be used in either a compact or extended orientation.

BRIEF SUMMARY OF THE INVENTION

Sawhorses having two pairs of legs and a crossbeam are known. Such devices have are used by carpenters and other workmen for supporting work pieces, such as lumber, panels, pipes, etc., at a convenient height so that the workmen can stand while performing operations on the object. US Patent Application 2008/0302604 discloses a sawhorse that can be extended via a telescoping crossbeam. However, the supporting legs do not correspondingly expand, leaving the sawhorse potentially unstable. It would be advantageous to have a sawhorse that is convertible from a compact configuration to an expanded one and is properly supported in both configurations.

According to the present invention, there is provided a sawhorse having a modular work surface, that has a first side portion, a second side portion, and a central portion. The modular work surface is configured to move between a compact configuration and an expanded configuration. In the compact configuration, the first side portion and the second side portion are adjacent to one another to provide a compact worktop and the central portion is positioned beneath the compact worktop. In the expanded configuration, the first side portion and the second side portion are distal to one another and the central portion is positioned therebetween to create an expanded worktop.

BRIEF DESCRIPTION OF THE DRAWINGS

The invention is herein described, by way of example only, with reference to the accompanying drawings, wherein.

DETAILED DESCRIPTION OF THE DRAWINGS

Figure 1:
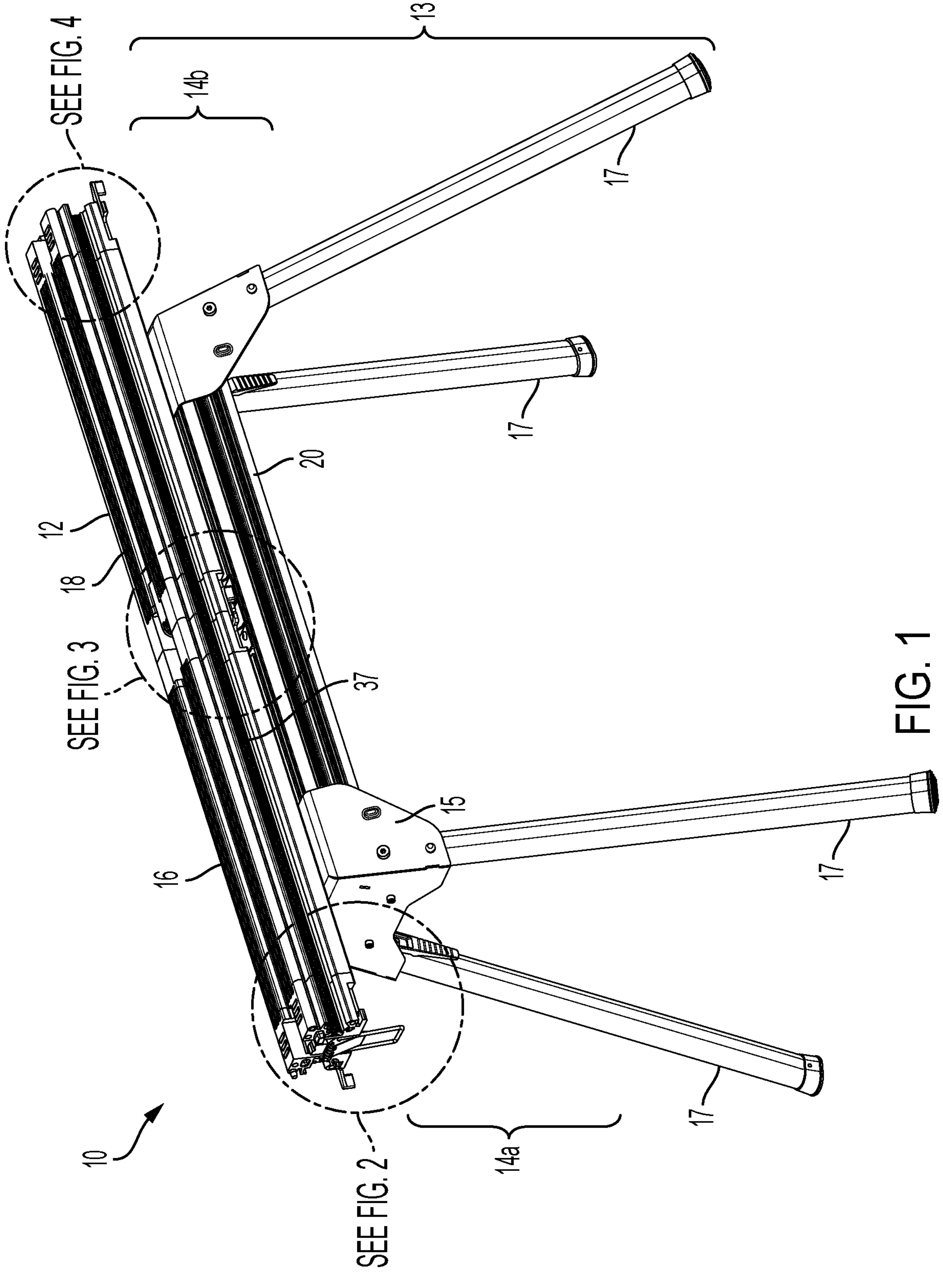
FIG. 1 is a perspective view of a sawhorse in its compact state.
Figure 4:
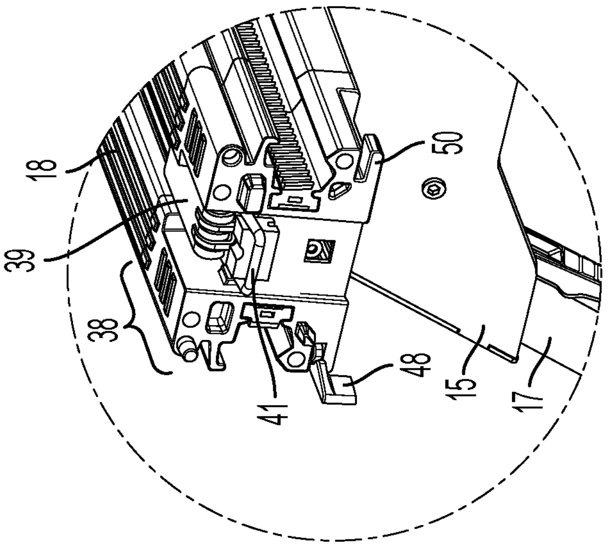
FIG. 4 is a detailed perspective view of a second end of the sawhorse.

FIG. 1 shows a sawhorse 10 in accordance with an embodiment of the present invention, in its compact configuration. The sawhorse includes a modular work surface 12 supported by a frame 13. The modular work surface 12 includes a first side portion 16, a second side portion 18, and a central portion 20. The modular work surface is configured to move between a compact configuration and an expanded configuration. In the compact configuration, the first side portion 16 and the second side portion 18 are adjacent one another to create a compact worktop and the central portion 20 is positioned beneath said compact worktop. In the expanded configuration, the first side portion 16 and the second side portion 18 are distal to one another and the central portion 20 is positioned therebetween to create an expanded worktop.

The frame 13 of the sawhorse may include a support rod 22 that spans two support mechanisms 14. Each support mechanism 14 may include a housing 15 and a plurality of legs 17 attached thereto. Preferably, each support mechanism includes two legs 17. The housing 15 may define a pivot 19 about which a leg 17 may move between a deployed position and a folded position. In the deployed position legs 17 may support the sawhorse 10. Legs 17 may further include spring biased or detent locks 21 that are configured to engage lock openings 23 defined by the housing 15. When the detent lock 21 engages the lock opening 23, the leg 17 is locked into either the deployed or folded position. Those skilled in the art will recognize that the housing 15 may define two lock openings 23 for each leg 17.

Figure 5:
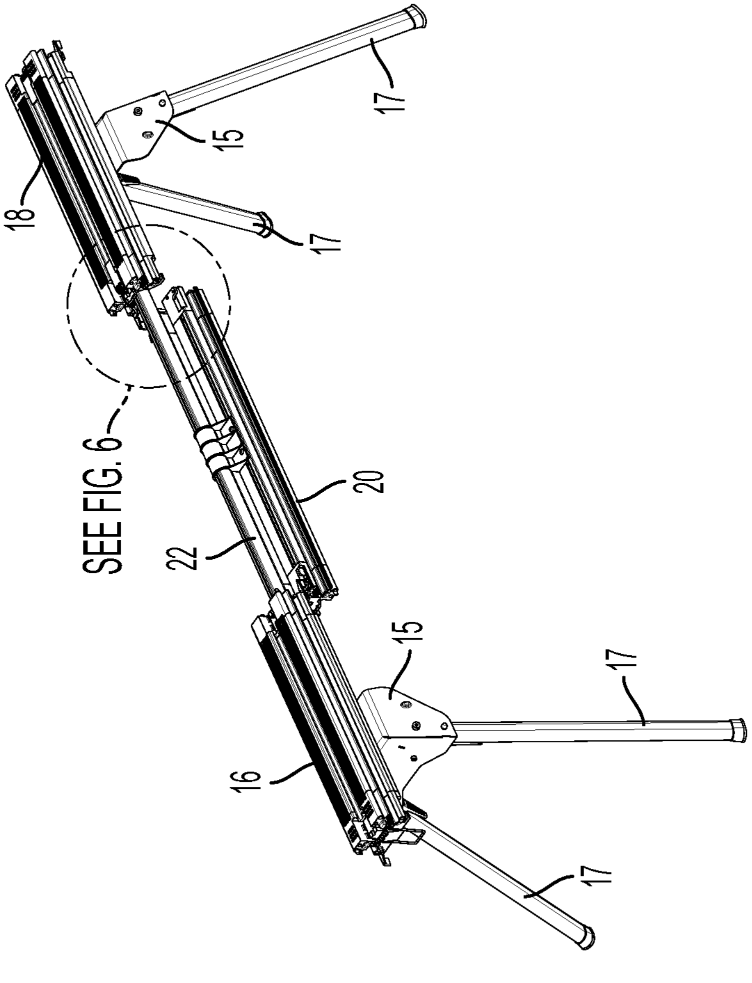
FIG. 5 is perspective view of the sawhorse in its first intermediate position.

To facilitate movement of the modular work surface 12 between its compact and expanded configurations, the first side portion 16 and second side portion 18 may be in horizontal sliding engagement with the support rod 22. As best seen in FIG. 5, which shows a first intermediate position of the sawhorse, the first side portion 16 and second side portion 18 may respectively be fixed to the two support mechanisms 14*a*, 14*b*, the overall length of the sawhorse 10 is increased. As the modular work surface is moved from its compact configuration to its expanded configuration. The central portion 20 is configured to rotate about the support rod 22 and selectively engage the support rod 22 via axial sliding engagement. Each of the first, second and central portions may respectively define a groove 24, 26, 28 that is configured to facilitate said portion's respective engagement with the support rod 22. Rotational engagement of the central portion 20 about the support rod 22 is facilitated by a connector 30.

Figure 7:
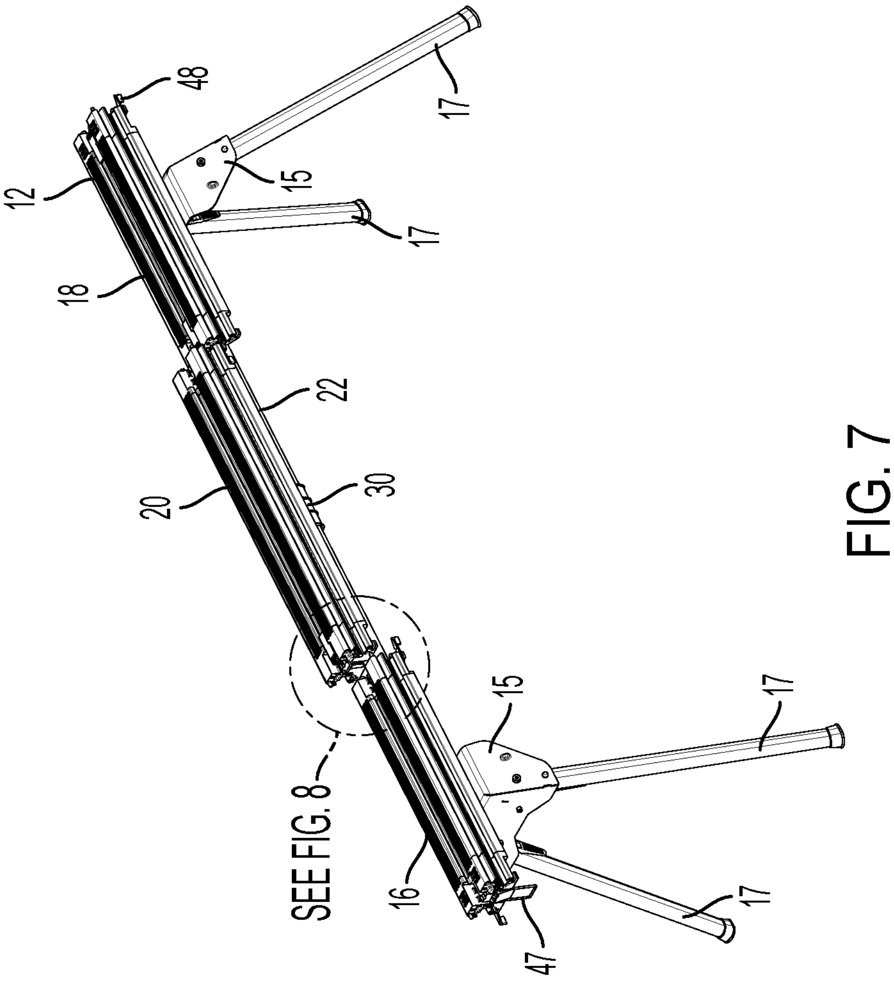
FIG. 7 is a perspective view of the sawhorse in its second intermediate position.
Figure 9:
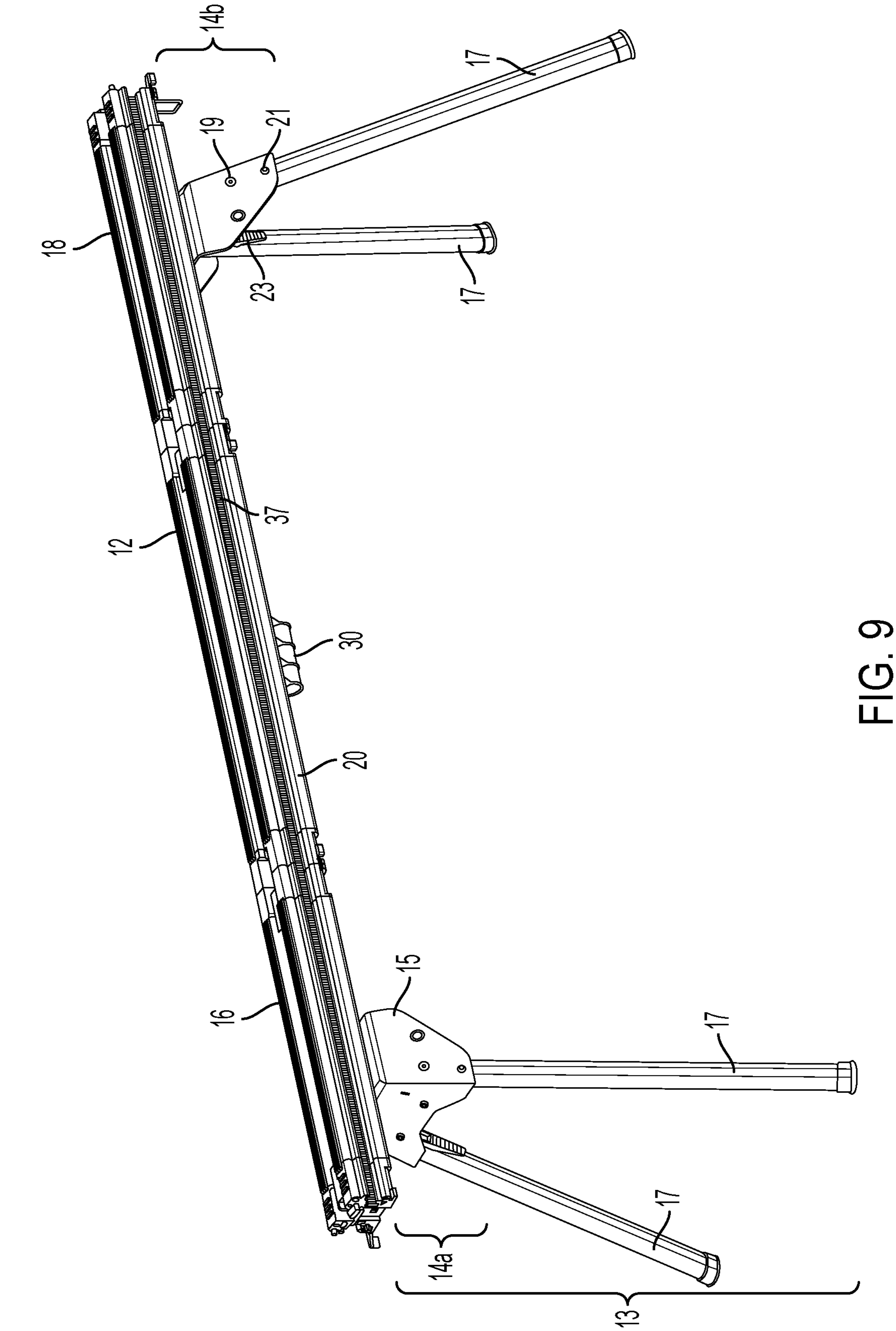
FIG. 9 is a perspective view of the sawhorse in its expanded configuration.

The connector 30 is configured to both permit selective rotation of the central portion 20 about the support rod 22 and hold the hold the central portion 20 beneath the first and second side portions 16, 18 in the compact and first intermediate configurations. (See FIGS. 1 and 5). In the second intermediate position, the central portion 20 is rotated about the support rod 22, such that it is above the first and second side portions 16, 18. (See FIG. 7). Finally, as seen in FIG. 9, in the expanded configuration, the connector 30 does not engage the support rod 22. Instead, the groove 28 of the central portion 20 is engaged to the support rod 22 and the central portion 20 is in same plane as the first and second side portions 16, 18.

Figure 3:
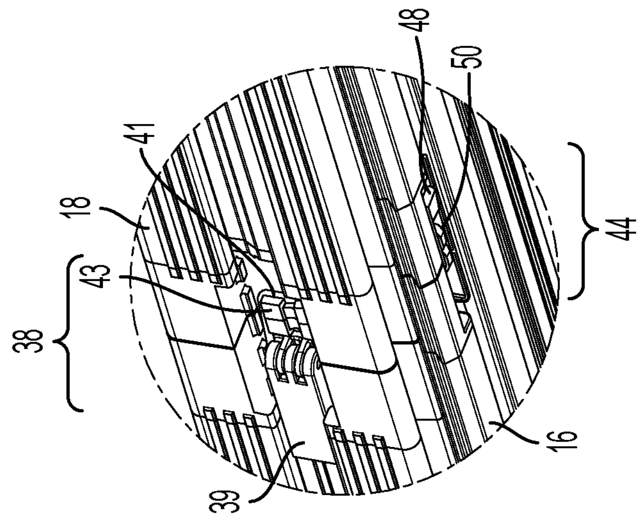
FIG. 3 is a detailed partial perspective view of the modular work surface when the sawhorse is in its compact configuration.
Figure 2:
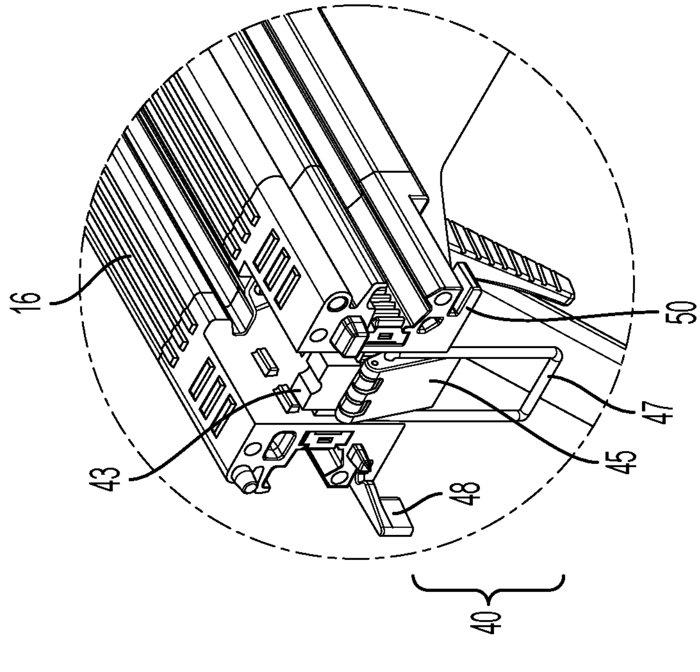
FIG. 2 is a detailed perspective view of a first end of the sawhorse.
Figure 6:
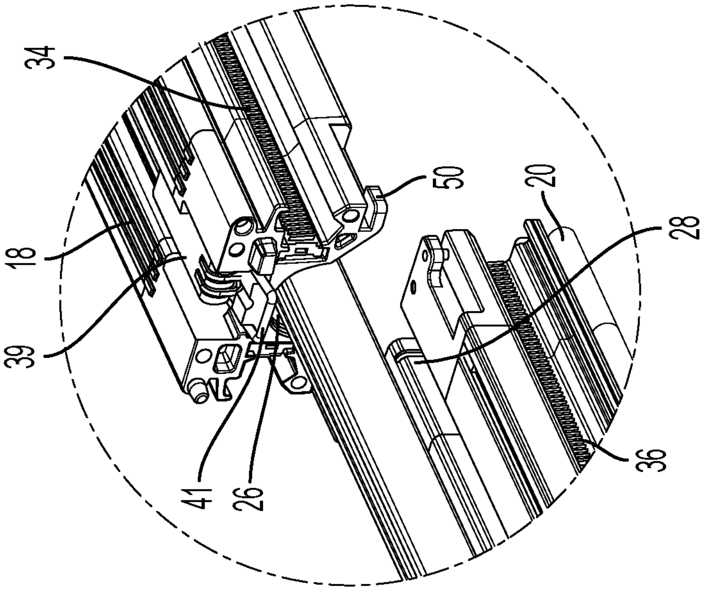
FIG. 6 is a detailed partial perspective view of the modular work surface when the sawhorse is in its first intermediate configuration.
Figure 8:
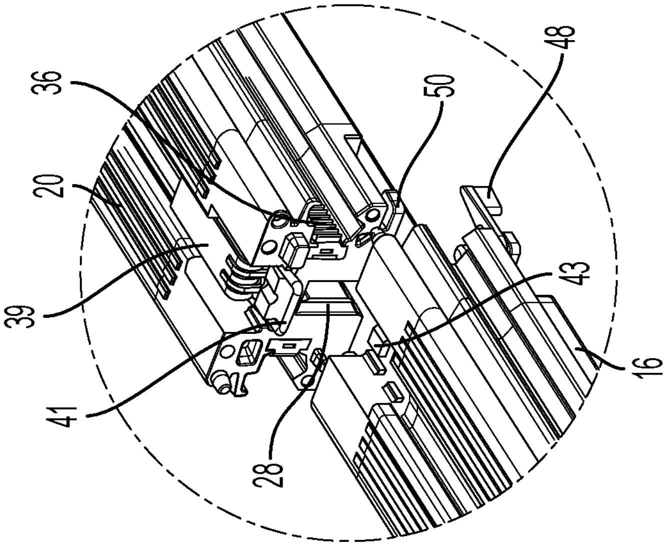
FIG. 8 is a detailed partial perspective view of the modular work surface when the sawhorse is in its second intermediate configuration.

As best seen in FIGS. 3 and 8, the sawhorse may also include one or more intra-horse latch mechanisms 38. Intra-horse latch mechanisms 38 are configured to secure the modular work surface 12 in either its compact configuration (FIG. 3) or its expanded configuration (FIG. 8). Those skilled in the art will recognize that, except for the portions to which they secure, the intra-horse latch mechanisms of both FIGS. 3 and 8 are virtually identical. Therefore, the reference numerals for each figure will be identical. Intra-horse latch mechanisms 38 may include a lever 39 and a wire loop 41 on a first portion and a protrusion 43 on the second portion. As seen in FIG. 3, Both the lever 39 and the wire loop 41 are rotatably attached to the first side portion 16, and the protrusion 43 is on the second side portion 18. When it is desired to secure the first side portion 16 to the second side portion 18, the two portions are moved adjacent to one another and the wire loop 41 is rotated to engage a protrusion 43. When this occurs, the lever 39 is typically rotated into a position (not shown) away from the first side portion and wherein it is not in the same plane as the first and second side portions 16, 18. Applying force to the lever such that it rotated back towards the first side portion 16 and into the plane of the first and second side portions subsequently causes the wire loop 41 to pull the protrusion 43 towards the first side portion 16. (See FIG. 3). Those skilled in the art will recognize that the intra-horse latch mechanisms 38 may be of a variety of different known configurations without departing from the scope of this invention.

Figure 11:
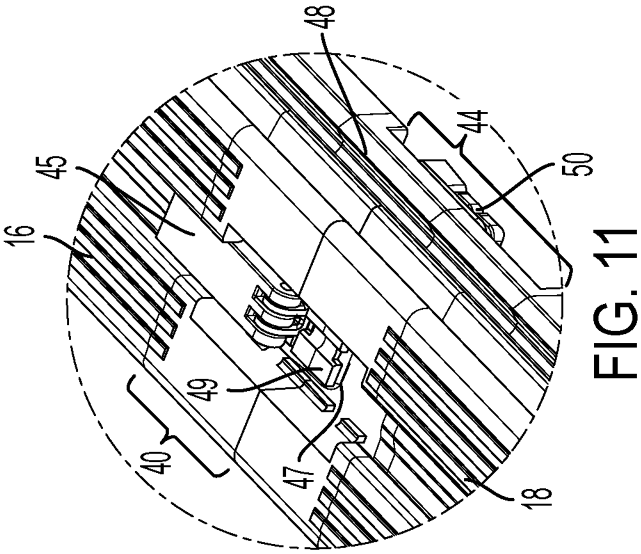
FIG. 11 is a detailed partial perspective view of the modular work surface of two linked sawhorses.
Figure 10:
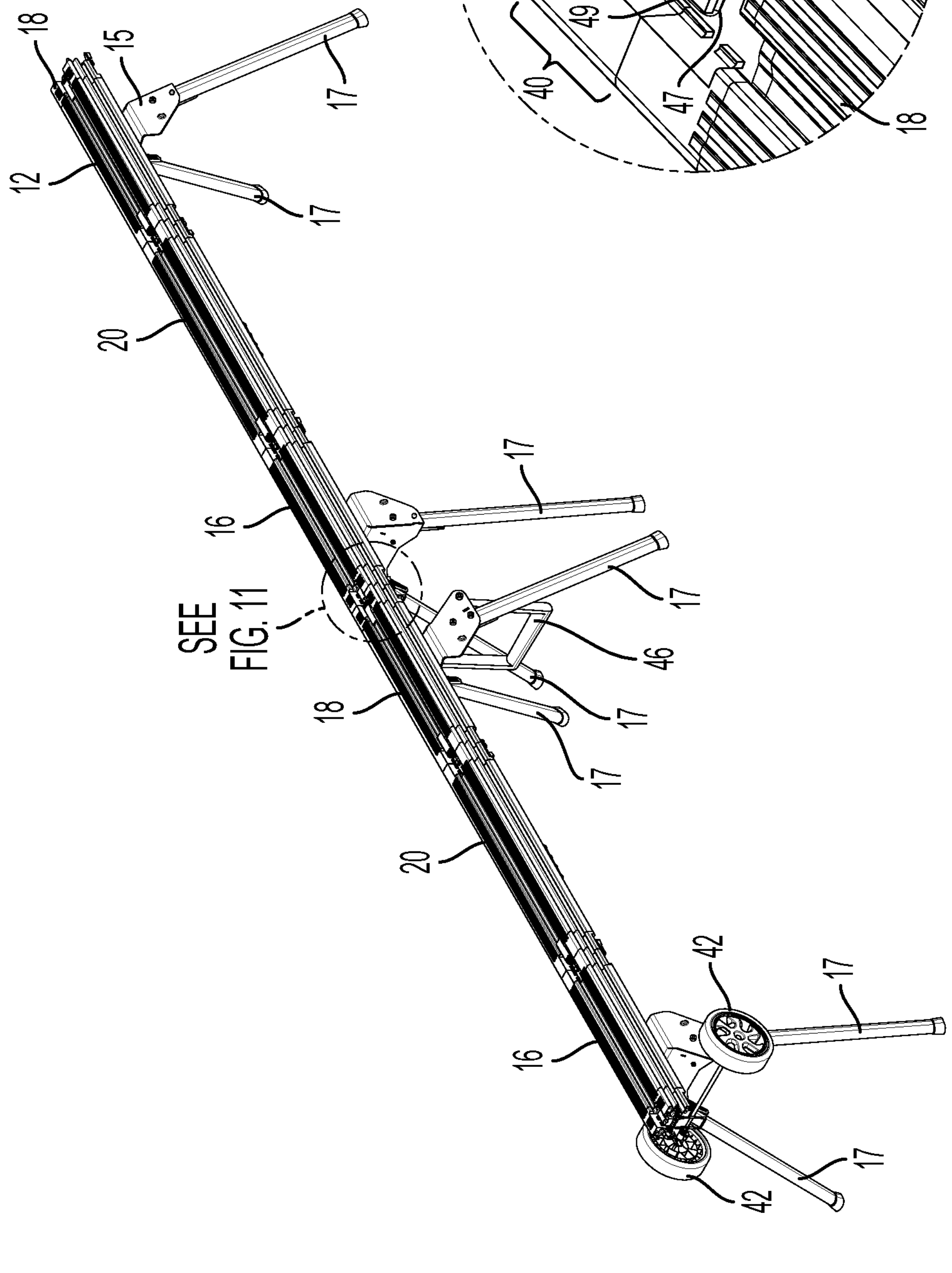
FIG. 10 is perspective view of two linked sawhorses each in their expanded configuration.
Figure 12:
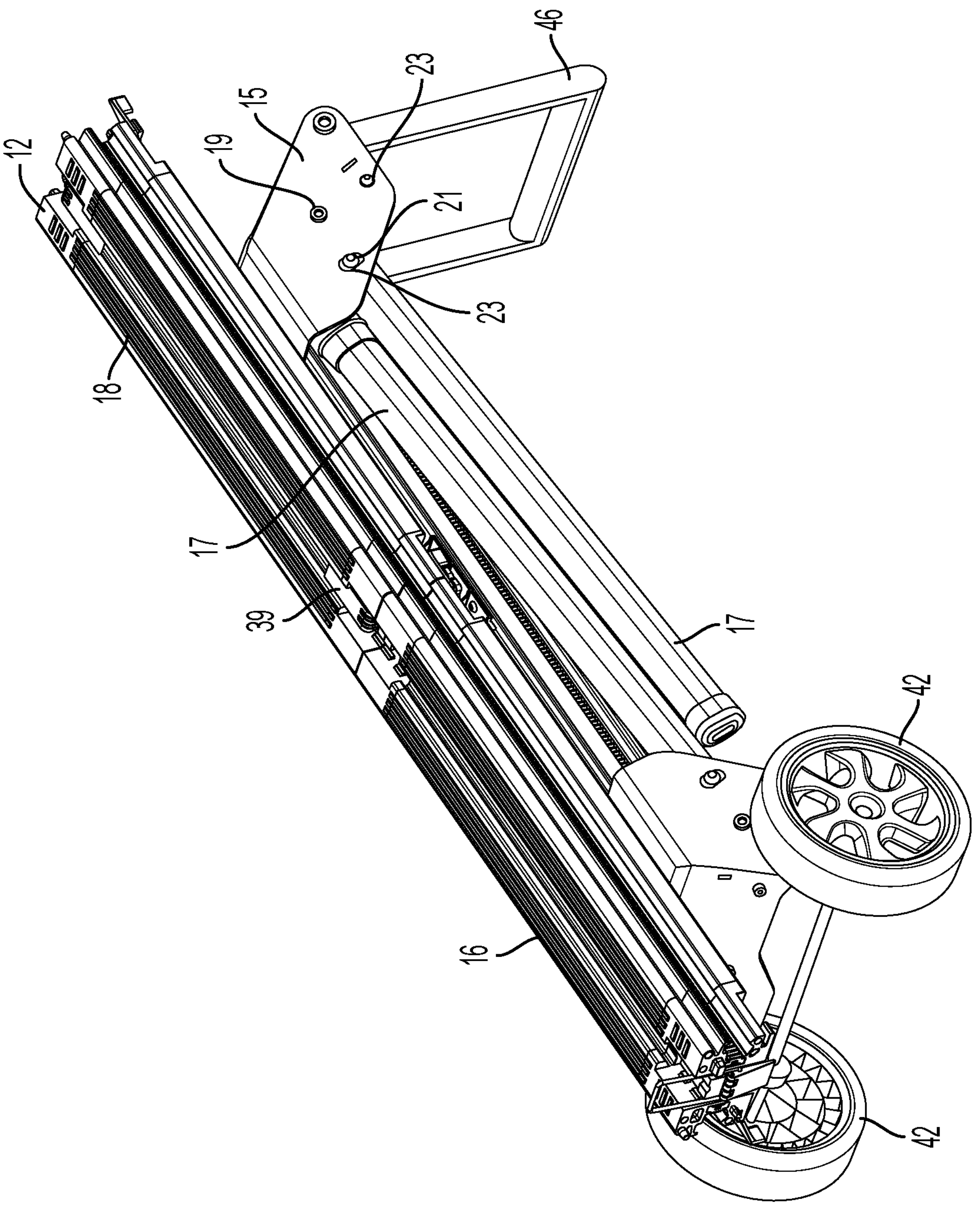
FIG. 12 is perspective view of the sawhorse in its compact and folded configuration.
Figure 14:
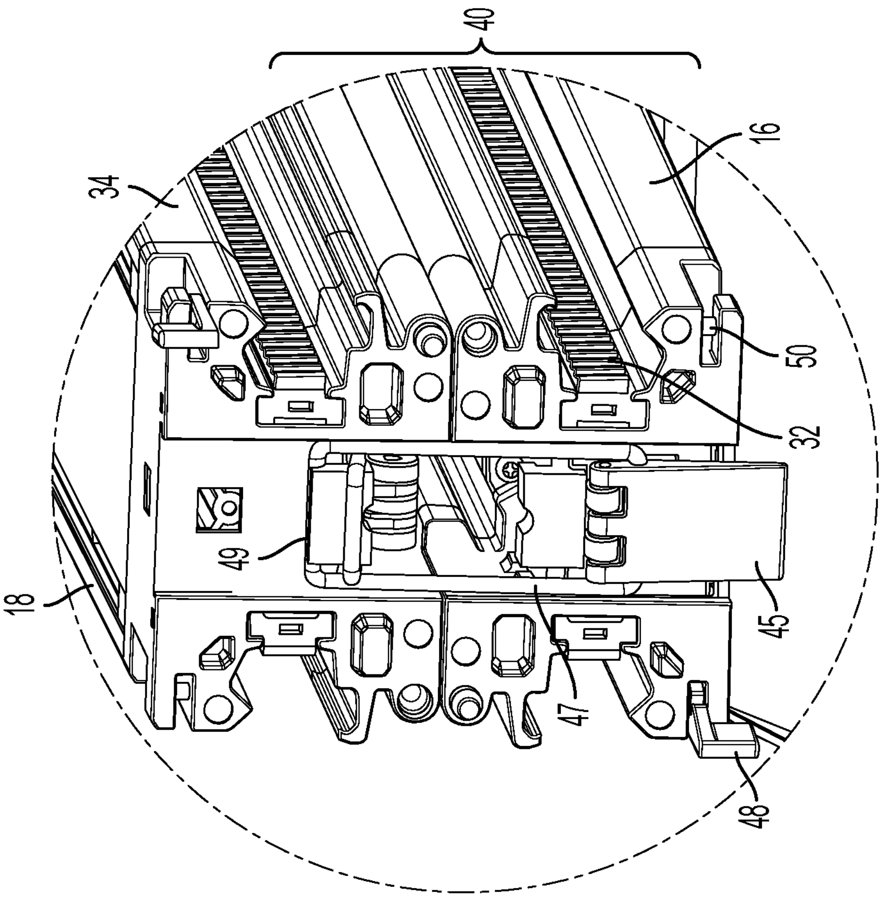
FIG. 14 is a detailed view of a first end of two linked sawhorses each in their compact and folded configuration.
Figure 13:
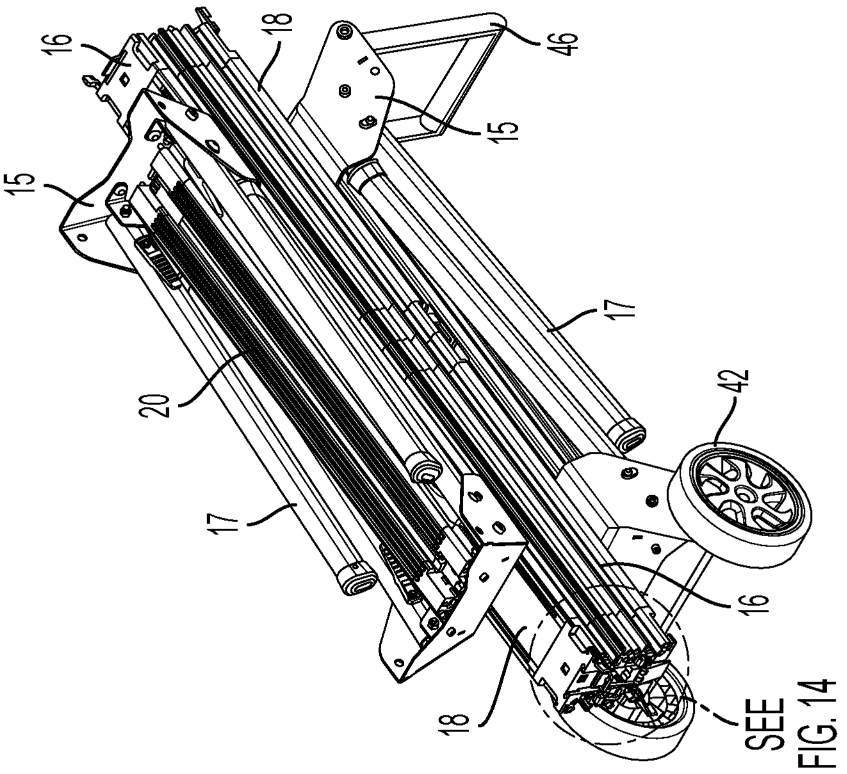
FIG. 13 is a perspective view of two linked sawhorses each in their compact and folded configuration.

As best seen in FIGS. 11 and 14, the sawhorse may also include one or more inter-horse latch mechanisms 40. Inter-horse latch mechanisms 40 are configured to secure one sawhorse 10 to another. More specifically, inter-horse latch mechanisms 40 secure the second side portion 18 of one sawhorse 10 to the first side portion 16 of another sawhorse 10. The inter-horse latch mechanisms 40 may be configured to connect two sawhorses 10 in a side-by-side configuration (FIG. 10) or in a back-to-back configuration (FIG. 13). Those skilled in the art will recognize that the inter-horse latch mechanisms 40 may include the same elements and operate identically to the intra-horse latch mechanism 38. Inter-horse latch mechanisms 40 may include a lever 45 and a wire loop 47 on a first portion and a protrusion 49 on the second portion. As seen in FIGS. 11 and 14, both the lever 45 and the wire loop 47 are rotatably attached to the first side portion 16, and the protrusion 49 is on the second side portion 18. When it is desired to secure the first side portion 16 to the second side portion 18, the two portions are moved adjacent to one another and the wire loop 47 is rotated to engage a protrusion 49. When this occurs, the lever 45 is typically rotated into a position (not shown) away from the first side portion and wherein it is not in the same plane as the first and second side portions 16, 18. Applying force to the lever such that it rotated back towards the first side portion 16 and into the plane of the first and second side portions subsequently causes the wire loop 47 to pull the protrusion 49 towards the first side portion 16. Those skilled in the art will recognize that the inter-horse latch mechanisms 38 may be of a variety of different known configurations without departing from the scope of this invention.

The sawhorse 10 may also include a variety of other features that improve its usefulness. For example, ground engaging wheels 42 and a handle 46 may help facilitate the transportation of the sawhorse 10. One or more locking mechanisms 44 may also be included to further secure portions together in either the compact, expanded or two sawhorses side-by-side configurations. Locking mechanisms 44 may include a swivel lock 48 on a first portion and an engagement stub 50 on a second portion. When the two portions are adjacent one another, the swivel lock 48 may be rotated to engage the engagement stub 50 such that horizontal movement between the portions is limited. See, for example, FIG. 11, which shows locking mechanism 44 securing two sawhorses in the side-by-side configuration.

Another feature that may be included with the sawhorse 10 is a toothed track. The first side portion 16, second side portion 18, and central portion 20 may all include a toothed track 32, 34, 36. In the compact configuration, the toothed tracks 32, 34 of the first and second side portions 16, 18 combine to form an uninterrupted toothed track 37. In the expanded configuration, the toothed tracks 32, 34, 36 of the first, second, and central portions all combine to form a single uninterrupted toothed track 37. The uninterrupted toothed tracks of either the compact or expanded configurations may facilitate the movement of an autonomous or otherwise controlled motor driven apparatus, such as an automated measuring unit.

DETAILED DESCRIPTION OF THE INVENTION

The operation of the sawhorse 10 according to the present invention will now be described. Beginning with a folded tandem pair as shown in FIG. 13, an operator may transport said pair to her worksite using the handle 46 and the ground engaging wheels 42. Once the pair of sawhorses are in their desired position, the operator will disengage the inter-horse latches 40. More specifically, she will lift the lever 45 that is connected to the first side portion 16 of the bottom sawhorse, such that wire loop 47 disengages from the protrusion of the second side portion 18 of the top sawhorse. She will repeat this process on the opposite side of the tandem pair to completely separate the two sawhorses from one another.

Once the sawhorses 10 are separate, the operator will move the legs 17 from their folded position to their deployed position. This is accomplished by retracting the detent lock 21 from the lock opening 23 in the housing 15. Once the detent lock 21 is retracted, the leg 17 can be rotated about its pivot 19 to the deployed position. This process is then repeated with each of the remaining legs 17.

After all of the legs 17 are moved to their deployed position, the sawhorse 10 is up righted as shown in FIG. 1. In this compact configuration, the sawhorse 10 is useable. However, in order to have an extended worksurface, the operator may wish to convert the sawhorse 10 to its expanded configuration. The first step is to release the intra-horse latch 38. Releasing the intra-horse latch 38 is achieved by rotating the lever 39 such that the loop 41 disengages from the protrusion 43, See FIG. 3. In addition to disengaging the intra-horse latch 38, the operator may also need to disengage the locking mechanism 44. This is done by rotating the swivel lock 48 such that it disengages from the engaging stub 50.

Once the intra-horse latch 38 and locking mechanism 44 are disengaged, the operator may separate the first side portion 16 from the second side portion. Specifically, the two side portions 16, 18, which are attached respectively attached to support mechanism 14*a*, 14*b*, slide along the support rod until the sawhorse reaches the first intermediate position. See FIG. 5. In this position, the connector holds the central portion 20 beneath the support rod 22 and the first and second side portions 16, 18. From here, the central portion 20 is rotated to a position above the support rod 22. See FIG. 7. The connector 30 facilitates this rotation. Once the central portion 20 is rotated to be above the support rod 22, the operator pushes the central portion 20 down so that groove 28 engages the support rod 22 via axial sliding engagement. The central portion 20 slides into the same plane as the first and second side portions 16, 18. The first and second side portions 16, 18 are then moved into contact with the respective opposite ends of the central portion 20. Intra-horse latches 38 and locking mechanism 44, may then be engaged to respectively secure the first side portion 16 to the central portion 20; and the central portion 20 to the second side portion 18. See FIG. 9. To the extent that an even larger work surface is needed, one or more additional sawhorses 10 may be attached via inter-horse latches 40. See FIG. 10.

It should be understood that although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the claims.

The invention claimed is:

1. A system comprising a first sawhorse and a second sawhorse, each of said first sawhorse and said second sawhorse comprising:

a first portion including a first portion work surface formed thereon, said first portion including a first portion first edge and a first portion second edge;

a second portion including a second portion work surface formed thereon, said second portion including a second portion first edge and a second portion second edge, said second portion work surface extending substantially coplanar to said first portion work surface such that when said first portion second edge is in contact with said second portion first edge said first portion work surface and said second portion work surface form a continuous sawhorse work surface;

said first portion including a protrusion disposed adjacent said first portion first edge, and said second portion including a loop disposed adjacent said second portion second edge; wherein, said first sawhorse and said second sawhorse may be secured together with said protrusion of said first sawhorse engageable with said loop of said second sawhorse.

2. The system recited in claim 1, each of said first sawhorse and said second sawhorse comprising a first support and a second support, wherein, said first portion of each sawhorse is disposed on said first support of each sawhorse and said second portion of each sawhorse is disposed on said second support of each sawhorse.

3. The system recited in claim 2, wherein, when said first sawhorse and said second sawhorse are secured together said first sawhorse continuous sawhorse work surface and said second sawhorse continuous sawhorse work surface form a continuous system sawhorse work surface.

4. The system recited in claim 3, said second portion second edge further including a lever rotatably secured thereon, said loop rotatably secured to said lever; wherein, in order to secure said first sawhorse to said second sawhorse said loop of said second sawhorse is disposed about said protrusion of said first sawhorse and said lever is rotated to pull said loop and said protrusion towards said second sawhorse.

5. The system recited in claim 2, said second portion second edge further including a lever rotatably secured thereon, said loop rotatably secured to said lever; wherein, in order to secure said first sawhorse to said second sawhorse said loop of said second sawhorse is disposed about said protrusion of said first sawhorse and said lever is rotated to pull said loop and said protrusion towards said second sawhorse.

6. The system recited in claim 2, wherein, when said first sawhorse and said second sawhorse are secured together said first portion of said first sawhorse is disposed upon said second portion of said second sawhorse.

7. The system recited in claim 1, said second portion second edge further including a lever rotatably secured thereon, said loop rotatably secured to said lever; wherein, in order to secure said first sawhorse to said second sawhorse said loop of said second sawhorse is disposed about said protrusion of said first sawhorse and said lever is rotated to pull said loop and said protrusion towards said second sawhorse.

8. The system recited in claim 1, wherein, when said first sawhorse and said second sawhorse are secured together said first portion of said first sawhorse is disposed upon said second portion of said second sawhorse.

9. The system recited in claim 1, wherein, when said first sawhorse and said second sawhorse are secured together said first sawhorse continuous sawhorse work surface and said second sawhorse continuous sawhorse work surface form a continuous system sawhorse work surface.

10. A system comprising a first sawhorse and a second sawhorse, each of said first sawhorse and said second sawhorse comprising:

a first portion including a first portion work surface formed thereon, said first portion including a first portion first edge and a first portion second edge;

a second portion including a second portion work surface formed thereon, said second portion including a second portion first edge and a second portion second edge, said second portion work surface extending substantially coplanar to said first portion work surface such that when said first portion second edge is in contact with said second portion first edge said first portion work surface and said second portion work surface form a continuous sawhorse work surface; and means to selectively secure and unsecure said first sawhorse to said second sawhorse, said means allowing said first sawhorse and said second sawhorse to be secured together in a first position where said first sawhorse continuous sawhorse work surface and said second sawhorse continues sawhorse work surface form a continuous system sawhorse work surface and in a second position where said first portion of said first sawhorse is disposed upon said second portion of said second sawhorse.

11. The system recited in claim 10, each of said first sawhorse and said second sawhorse comprising a first support and a second support, wherein, said first portion of each sawhorse is disposed on said first support of each sawhorse and said second portion of each sawhorse is disposed on said second support of each sawhorse.

12. The system recited in claim 11, said means to secure and unsecure comprising a protrusion disposed adjacent said first portion first edge and a loop disposed adjacent said second portion second edge.

13. The system recited in claim 10, said means to secure and unsecure comprising a protrusion disposed adjacent said first portion first edge and a loop disposed adjacent said second portion second edge.

14. A system comprising a first sawhorse and a second sawhorse, each of said first sawhorse and said second sawhorse comprising:

a work surface having a first edge and a second edge;

a protrusion disposed adjacent said first edge;

a loop disposed adjacent said second edge; wherein, said first sawhorse and said second sawhorse may be secured together with said protrusion of said first sawhorse engageable with said loop of said second sawhorse; and wherein, said first sawhorse and said second sawhorse may be secured together in a first position where said first sawhorse work surface and said second sawhorse work surface form a continuous system sawhorse work surface and in a second position where said first sawhorse work surface is disposed upon said second sawhorse work surface.

* * * * *